United States Patent [19]

Watanabe

[11] 4,148,360

[45] Apr. 10, 1979

[54] METHOD FOR ACIDIZING HIGH TEMPERATURE SUBTERRANEAN FORMATIONS

[75] Inventor: David J. Watanabe, Orange, Calif.

[73] Assignee: Union Oil Company of California, Brea, Calif.

[21] Appl. No.: 885,450

[22] Filed: Mar. 10, 1978

[51] Int. Cl.² .................... E21B 43/26; E21B 43/27
[52] U.S. Cl. ................................. 166/300; 166/307; 166/308; 252/855 C
[58] Field of Search ............. 166/271, 281, 300, 307, 166/308

[56] References Cited

U.S. PATENT DOCUMENTS

| | | | |
|---|---|---|---|
| 1,916,122 | 6/1933 | Grebe | 252/8.55 C |
| 2,059,459 | 11/1936 | Hund | 166/307 X |
| 2,124,530 | 7/1938 | Loomis et al. | 166/307 |
| 2,259,428 | 10/1941 | Shelley | 166/302 |
| 2,265,923 | 12/1941 | Normand | 166/307 X |
| 2,358,665 | 9/1944 | Shapiro | 252/8.55 B X |
| 2,765,851 | 10/1956 | Bond | 166/305 R |
| 3,215,199 | 11/1965 | Dilgren | 166/300 X |
| 3,288,216 | 11/1966 | Blickensderfer et al. | 166/305 R |
| 3,297,090 | 1/1967 | Dilgren | 166/307 X |
| 3,307,630 | 3/1967 | Dilgren et al. | 166/300 |
| 3,379,249 | 4/1968 | Gilchrist et al. | 166/270 |
| 3,605,899 | 9/1971 | Tate et al. | 166/300 |
| 3,695,354 | 10/1972 | Dilgren et al. | 166/272 |
| 3,828,854 | 8/1974 | Templeton et al. | 166/307 |
| 3,868,998 | 3/1975 | Lybarger et al. | 166/307 X |
| 3,938,593 | 2/1976 | Friedman | 166/307 |

*Primary Examiner*—Stephen J. Novasad
*Assistant Examiner*—George A. Suchfield
*Attorney, Agent, or Firm*—Richard C. Hartman; Dean Sandford; Daniel R. Farrell

[57] ABSTRACT

Subterranean formations having temperatures between about 250° F. and about 700° F. are acidized by introducing a substantially anhydrous acid precursor through a well and into the formation, wherein the precursor hydrolyzes in situ to generate a hydrohalic acid. The acid precursor is a normally liquid, halogenated hydrocarbon having one or two carbon atoms per molecule which is thermally stable under the high temperature and pressure conditions encountered prior to hydrolysis.

28 Claims, No Drawings

METHOD FOR ACIDIZING HIGH TEMPERATURE SUBTERRANEAN FORMATIONS

BACKGROUND OF THE INVENTION

1. Field of the Invention

This invention relates to a method for treating a subterranean formation penetrated by a well, and more particularly concerns a method for acidizing relatively high temperature subterranean formations penetrated by a well.

2. Description of the Prior Art

Acidization of wells is a well-known process for increasing or restoring the permeability of subterranean formations to thereby facilitate the flow of formation fluids, such as oil, gas or a geothermal fluid, into the well from the formation, and also facilitate the injection of fluids through the well into the formation. Acidization involves treating the formation with an acid, typically hydrochloric acid, in order to dissolve clogging deposits, such as carbonate scale, thereby opening pores and other flow channels and increasing the permeability of the formation. Hydrofluoric acid or a mixture of hydrofluoric and hydrochloric acids, commonly known as "mud acid", is typically employed to dissolve siliceous deposits.

Numerous acidization methods have been proposed to cope with varying well conditions and special formation problems. However, in recent years the increased activity in drilling very deep oil and gas wells and geothermal wells has outpaced the development of suitable acidization methods, primarily due to the high temperature of these formations.

A problem common to all the prior art acidization processes is the corrosion of the well equipment, particularly the downhole tubing and casing, which is exposed to the acidizing fluid. Because the reactivity of an acid is significantly increased at higher temperatures, the corrosion of well equipment is especially serious in the acidization of high temperature formations.

Corrosion inhibitors are generally incorporated into the acidizing fluid prior to its injection into the well. However, the effectiveness of the known corrosion inhibitors decreases at higher temperatures, and the expense of the corrosion inhibitors, which are significant even at low temperatures, become prohibitive at temperatres above about 250° F. Another difficulty with the known corrosion inhibitors, especially when used in the large quantities required in high temperature wells, is their tendency to form insoluble solids upon reaction with formation materials, thereby damaging the formation.

Another problem in the acidization of high temperature formations is that the acid is rapidly consumed by the reactive material immediately adjacent the borehole before the acid can penetrate any significant distance into the formation. Without adequate formation penetration, the acidization operation is of little value. In view of these problems, the prior art acidization methods are limited, as a practical matter, to the acidization of formations having temperatures on the order of 250° F. and less. Thus, there exists a need for a method for acidizing high temperature subterranean formations.

Accordingly, it is a principal object of this invention to provide a method for acidizing high temperature subterranean formations.

Another object of the invention is to provide an acidization method which results in no more than an acceptable rate of corrosion of metal well equipment.

Still another object of the invention is to provide a simple but effective method for acidizing subterranean formations having temperatures on the order of 250° F. to 700° F. and higher, which method results in little or no corrosion of the well hardware.

Yet another object of the invention is to provide an acidization method for high temperature formations which does not require the use of corrosion inhibitors or other expensive chemical additives.

A further object of this invention is to provide an acidization method in which a noncorrosive, nonscaling, acid precursor is displaced through a well and into a high temperature formation, wherein the precursor reacts in situ to generate a strong acid.

A still further object of this invention is to provide a method for acidizing those portions of high temperature formations which are relatively remote from a borehole.

Another object of this invention is to provide a method for simultaneously acidizing and hydraulically fracturing a high temperature subterranean formation.

Still further objects, advantages and features of the invention will become apparent to those skilled in the art from the following description.

SUMMARY OF THE INVENTION

Briefly, the invention provides an improved method for acidizing subterranean formations having temperatures between about 250° F. and about 700° F., wherein a substantially anhydrous, acid precursor is introduced through a well and into contact with the formation. The acid precursor is displaced from the borehole into the formation wherein it hydrolyzes in situ to generate a hydrohalic acid. The acid precursor is a normally liquid, halogenated hydrocarbon having a generalized formula:

wherein
 x = 1 or 2;
 y = 0, 1 or 2, but y ≦ x; and
 z = 2x − y + 2, and which is thermally stable under the high temperature and pressure conditions encountered prior to hydrolysis.

The method of this invention allows acidization of subterranean formations in which the prior art acidization methods are rendered impractical due to the high formation temperatures. The invention provides an acidization method for high temperature formations in which corrosion of well equipment is substantially eliminated and the undesirable consumption of acid by the formation immediately adjacent the borehole is avoided. The method can be employed in high temperature formations having a large connate water concentration, such as a formation containing an aqueous geothermal fluid, or in high temperature formations having little or no connate water. The method has the advantage of being operable with conventional well equipment and does not require the use of exotic alloys or other materials to avoid corrosion of the well equipment.

DETAILED DESCRIPTION OF THE INVENTION

The method of this invention is suitable for the acidization of relatively high temperature subterranean formations and finds particular utility in the acidization of subterranean formations having temperatures on the order of 250° F. and higher, and especially from 400° F. to 700° F. By proper selection of acid precursors described more fully hereinbelow, the method of this invention is suitable for acidizing subterranean formations containing carbonate materials, such as limestone and dolomite, siliceous materials, such as sandstone and clay, and other acid-soluble formation constituents.

The acid precursor suitable for use in the method of this invention is a normally liquid, halogenated hydrocarbon having one or two carbon atoms per molecule. More specifically, the acid precursor is a normally liquid halogenated hydrocarbon having the generalized formula:

$$C_xH_yX_z$$

wherein
 x = 1 or 2;
 y = 0, 1 or 2, but y ≤ x; and
 z = 2x − y + 2,
and which is thermally stable under the high temperature and pressure conditions to which it is exposed prior to hydrolysis.

The term "thermally stable" as used herein is meant to exclude compounds which spontaneously decompose and/or polymerize under the temperature and pressure conditions to be encountered. Halogenated hydrocarbons which thermally decompose under the conditions encountered prior to hydrolysis are to be avoided since some of the decomposition products, such as chlorine, are highly toxic, and other of the decomposition products, such as a tar resulting from the pyrolysis of halogenated hydrocarbons having three or more carbon atoms per molecule, tend to form plugging deposits which are difficult to remove.

The term "normally liquid" as used herein includes those compounds which exist as liquids under the ambient temperature and pressure conditions at the well site. In general, a compound which is "normally liquid" for the purposes of this invention has a normal melting point less than about 80° F., preferably less than about 30° F., and has a normal boiling point above about 80° F., preferably above about 120° F. Normally liquid compounds are more easily handled at the well site and more easily injected through a well into the subterranean formation in the method of this invention. The term "normally liquid" is meant to exclude compounds which exist only as a solid or a gas under the temperature and pressure conditions to which they will be exposed during handling at the well site and introduction into the well.

The treating fluid injected through a well in the method of this invention should consist essentially of the acid precursor or a mixture of acid precursors, and not contain any more than a minor amount of other materials such as water, hydrocarbons, surfactants or other materials which would significantly affect the rate of hydrolysis of the acid precursor. The addition of surfactants and/or other hydrocarbon additives to the treating fluid retards the rate and degree of hydrolysis of the acid precursor and the presence of these compounds at very high temperatures often results in the production of pyrolytic products which damage the formation. The presence of oxygen-containing compounds, including oxygen-containing hydrocarbon solvents, such as alcohols and ketones, must be avoided since at high temperatures these compounds are often corrosive even in an anhydrous state.

As discussed above, polymerizable or pyrolyzable compounds must be avoided in the acidization method particularly in very high temperature wells. Accordingly, unsaturated hydrocarbons must also be avoided. Halogenated hydrocarbons having three or more carbon atoms, and at very high temperatures two or more carbon atoms, tend to hydrolyze to form polymerizable and/or pyrolyzable side reaction products, such as propylene and acetic acid, respectively, and must therefore also be avoided. It is also preferable to avoid compounds which are flammable or explodable under the temperature and pressure conditions to which they are exposed during handling at the well site.

The halogenated hydrocarbons having one carbon atom per molecule which are suitable for use as the acid precursor in the method of this invention include the normally liquid compounds having the general formulas $CX_4$ or $HCX_3$ which are thermally stable under the temperature and pressure conditions to be encountered. Suitable compounds of the formula $CX_4$ include: tetrachloromethane, fluorotrichloromethane, bromotrichloromethane and dibromodichloromethane. Suitable compounds of the formula $HCX_3$ include: trichloromethane, tribromomethane, chlorodibromomethane, bromodichloromethane, iododibromomethane, chlorodiiodomethane, iododichloromethane and fluorochlorobromomethane.

The halogenated hydrocarbons having two carbon atoms per molecule which are suitable for use as the acid precursor in the method of this invention include the normally liquid compounds having the general formulas $C_2X_6$, $HC_2X_5$ and $H_2C_2X_4$ which are thermally stable under the temperature and pressure conditions to be encountered. Suitable compounds of the formula $C_2X_6$ include: 1,2-difluorotetrachloroethane, 1,1,2-trifluorotrichloroethane and 1,1,2-trifluorotribromoethane. Suitable compounds of the formula $HC_2X_5$ include: pentachloroethane, fluorotetrachloroethane, fluorotetrabromoethane, difluorotribromoethane, 1,2-dichloro 1,1,2-tribromoethane, 1,1,-dichloro 1,2,2-tribromoethane, dibromotrifluoroethane, dibromotrichloroethane and fluorodichlorodibromoethane. Suitable compounds of the formula $H_2C_2X_4$ include: tetrachloroethane (both the symmetrical and unsymmetrical isomers), tetrabromoethane (both the symmetrical and unsymmetrical isomers), fluorotrichloroethane, 1-fluoro 1,1,2-tribromoethane, 1-fluoro 1,2,2-tribromoethane, difluorodichloroethane, 1,2-difluoro 1,2-dibromoethane, 1,1-difluoro 2,2-dibromoethane, chlorotribromoethane, 1,1-dichloro 1,2-dibromoethane, 1,2-dichloro 1,2-dibromoethane, 1,1-dichloro 2,2-dibromoethane and bromotrichloroethane.

Mixtures of the described acid precursors can also be employed either in the form of a solution or an admixture. The use of a plurality of discrete slugs of different acid pecursors, or mixtures of acid precursors, is also contemplated and in some cases is preferred, as is described more fully hereinbelow.

The selection of a particular acid precursor for use in the method of this invention will depend, inter alia, upon the hydrohalic acid desired, the formation material to be acidized, the temperature and pressure conditions to which the acid precursor will be exposed prior to hydrolysis, and the availability, cost and handling characteristics of the acid precursor. For the acidization of carbonate materials and other acid-soluble formation materials having high concentrations of calcium, magnesium or other multivalent cations, acid precursors which hydrolyze to generate hydrochloric, hydrobromic or hydroiodic acids are preferred, particularly the hydrochloric acid precursors. However, for the acidization of siliceous materials, such as clay, hydrofluoric acid precursors are preferred and acid precursors which hydrolyze to generate a mixture of hydrofluoric and hydrochloric acids are particularly preferred.

In general, the halogenated hydrocarbons having one carbon atom are preferred over the halogenated hydrocarbons having two carbons, especially at formation temperatures above about 500° F., because various side reaction products of the hydrolysis of the halogenated hydrocarbons having two carbon atoms, such as acetic acid, can be pyrolyzed to form plugging solid residues at these very high temperatures. Of the halogenated hydrocarbons having one carbon atom, the acid precursors of the formula $CX_4$ are preferred, and tetrachloromethane (i.e., carbon tetrachloride) is particularly preferred due to its ability to hydrolyze readily over the temperature range 250° to 700° F., as well as its low cost and availability.

The preferred hydrochloric acid precursors are tetrachloromethane, trichloromethane, pentachloroethane and tetrachloroethane, with tetrachloromethane being particularly preferred. Preferred acid precursors which hydrolyze to form a mixture of hydrochloric and hydrobromic acids are bromotrichloromethane chlorodibromomethane, bromodichloromethane, trichlorodibromoethane, 1,1-dichloro 1,2-dibromoethane, 1,2-dichloro 1,2-dibromoethane, and 1,1-dichloro 2,2-dibromoethane. Preferred acid precursors which hydrolyze to form a mixture of hydrochloric and hydrofluoric acids are 1,1,2-trifluorotrichloroethane, fluorotetrachloroethane and fluorotrichloroethane, with 1,1,2-trifluorotrichloroethane being particularly preferred.

In the method of this invention, a treating fluid consisting essentially of the acid precursor is introduced through a well and into the subterranean formation to be acidized. During its passage through the well, the treating fluid must be in a substantially anhydrous state to avoid premature hydrolysis and the resulting corrosion of the injection equipment. The term "substantially anhydrous" as used herein is meant to include treating fluids having not more than a minor amount of water. The amount of water which can be tolerated in the treating fluid depends primarily upon the temperature to which the treating fluid is heated during its passage through the well. For example, at relatively low treating fluid temperatures, such as temperatures on the order of 250° to 300° F., water concentrations of about 10 weight percent may be acceptable because the acid precursor and water are immiscible and therefore do not hydrolyze readily. However, at relatively high treating fluid temperatures, such as on the order of 500° to 700° F., water concentrations must be less than about 1 weight percent due to the accelerated rate of hydrolysis at these temperatures. For the purposes of this invention, a treating fluid is "substantially anhydrous" when it contains less than the amount of water required to cause a significant amount of hydrolysis during passage through the well, which significant amount results in an unacceptable rate of corrosion of the injection equipment. Best results are obtained when the treating fluid is introduced into the well as an anhydrous liquid.

The introduction of the treating fluid into the subterranean formation can be accomplished by a variety of well-known fluid injection methods, provided that the acid precursor is not prematurely mixed with water. The suitability of a particular method for injection of the treating fluid will depend, inter alia, upon whether or not water must also be injected through the well. No water injection is normally required in the acidization of a formation containing an aqueous geothermal fluid, such as steam or brine. However, deep oil and gas wells, particularly hot, dry gas wells, usually will require the injection of water to hydrolyze the acid precursor.

One method for injecting the treating fluid comprises running a dry, or substantially dry, injection tubing having a remotely controllable downhole valve into the well; introducing the desired quantity of the substantially anhydrous treating fluid into the injection tubing; opening the downhole valve; and displacing the treating fluid from the injection tubing into the formation by means of a displacement fluid. This procedure is especially preferred for those acidization operations which do not require water injection, such as in the acidization of a formation containing geothermal steam, brine or other high temperature aqueous fluid. As the temperature of the formation to be acidized is increased, the importance of having a water-free treating fluid and a water-free injection tubing is increased. The displacement fluid can be any inert fluid, such as nitrogen or an aqueous or oleaginous fluid which is noncorrosive and nonplug-forming under the conditions encountered in the injection tubing. Preferred oleaginous displacement fluids are the solvent refined paraffinic lubricating oil base stocks, known as neutral oils and bright stocks, such as are used conventionally in the manufacture of lubricating oils for industrial turbines and other machines operating at high temperatures.

A slightly modified procedure is employed for the acidization operations in which water injection is also required. As in the above-described procedure, the substantially anhydrous treating fluid is injected through an injection tubing into the subterranean formation. Since the relatively water-free formations which require water injection, such as hot, dry gas wells, typically have temperatures between about 250° F. and about 400° F., the presence of minor amounts of water in the treating fluid and/or injection tubing is not as critical. Accordingly, both the substantially anhydrous treating fluid and water can be introduced through the injection tubing, preferably in the form of a plurality of small, discrete alternating slugs. Because the acid precursors are relatively insoluble in water there will be little mixing and/or hydrolysis during the passage through the injection tubing at these temperatures.

A particularly preferred method for injecting both an acid precursor and water into the formation comprises injecting a slug of the substantially anhydrous treating fluid through a water-free injection tubing; simultaneously injecting water through the well annulus between the injection tubing and the walls of the borehole; and thereafter injecting a slug of excess water followed by an inert displacement fluid, such as nitrogen, through the injection tubing and well annulus to overdisplace the mixed acid precursor and water into the formation. This procedure produces good mixing of the acid precursor and water in the borehole prior to entry into the formation, and yet, because the hydrolysis rate is relatively slow, the hydrohalic acid is not produced to any significant extent until the reaction mixture has been displaced well into the formation. The excess water injected removes any acid precursor remaining in the injection tubing, and the nitrogen displaces the reaction mixture into the formation away from the borehole.

In a preferred embodiment of the method of this invention a high temperature subterranean formation is hydraulically fractured as the acid precursor is hydrolyzing in situ. The technique of fracture-acidizing is well known and therefore need not be described more fully herein except for the following novel features. In a preferred method of fracture acidizing, the substantially anhydrous treating fluid is introduced under pressure through the injection tubing and into the subterranean formation while an aqueous solution containing a water-soluble, viscosity-increasing agent is simultaneously injected under pressure through the well annulus and, subsequently, through the injection tubing to displace the acid precursor into the subterranean formation as it is being hydraulically fractured. The exposed fracture surfaces provide a hot, clean surface for reaction with the in situ produced acid. Suitable viscosity increasing agents include the thermally stable, water-soluble polymers normally used in hydraulic fracturing, such as polyacrylamides and polyvinylpyrrolidones. As is conventional, propping agents can be injected to hold the newly formed fractures open after the pressure is reduced.

The factors to be considered in selecting the quantity of acid precursor and/or water to be injected in the method of this invention are essentially the same as in a conventional acidization operation. By way of example, an acid treatment which would conventionally call for the use of about 10,640 gallons of a 15 weight percent hydrochloric acid solution, requires the injection of about 1,000 gallons of tetrachloromethane and, in the case of a relatively water-free formation, about 9,640 gallons of water. The design of a particular acidization operation using the method of this invention will therefore become obvious to those skilled in the art from these well-known factors when taken in view of this disclosure.

In a preferred method for acidization of siliceous formation materials, two discrete slugs of substantially anhydrous acid precursors are successively introduced into the subterranean formation. The first slug consists essentially of a hydrochloric acid precursor, preferably tetrachloromethane. The second slug consists essentially of a hydrochloric and hydrofluoric acid precursor, such as 1,1,2-trichlorotrifluoroethane, or preferably consists essentially of a mixture of a hydrochloric acid precursor, such as tetrachloromethane, with an acid precursor, such as 1,1,2-trichlorotrifluoroethane, which hydrolyzes to form a mixture of hydrofluoric and hydrochloric acids. Preferably, the mixture employed in the second slug is one which will hydrolyze in situ to generate an acid solution having a hydrochloric acid to hydrofluoric acid ratio therein of between about 2 and about 5, as is conventional in a "mud acid". The function of the hydrochloric acid produced by hydrolysis of the first slug is (1) to provide a low pH environment relatively free of cations which would otherwise form insoluble fluoride or fluosilicate salts, such as calcium fluoride and sodium fluosilicate, respectively, with the subsequently produced hydrofluoric acid, and (2) to consume carbonates and other highly reactive, nonsiliceous materials in the formation thereby conserving the later-introduced hydrofluoric acid for reaction with the siliceous materials to be acidized.

An inert gas, such as nitrogen, can be added to the fluids injected in the method of this invention to aid in the mixing of the acid precursor and water in the formation. Between about 50 and about 5,000 standard cubic feet of the inert gas per barrel of the injected fluid is preferred, and good results are obtained when about 1,000 standard cubic feet of nitrogen per barrel of fluid is employed.

After displacement of the treating fluid into the formation, the well is shut in for a preselected time to allow the acid precursor to hydrolyze and the in situ-produced acid to be consumed in the desired acidization of formation materials. The degree of hydrolysis achieved in situ is determined by the length of time the well is shut in. When less than complete hydrolysis is achieved, precautions must be taken to handle the unreacted acid precursor and any noxious intermediate reaction products. After the preselected period, the borehole is preferably flushed with a conventional well cleaning fluid, such as water, and the well effluent is contacted in a pit or other contacting device with a dilute ammonium hydroxide solution for a short time prior to returning the well to its normal injection or production operation.

The degree of hydrolysis achieved in a preselected period of time will depend, inter alia, upon the particular acid precursor, and the temperature and pressure conditions in the formation. The rate of hydrolysis generally increases with increases in temperature and/or pressure. In formations having temperatures between about 250° F. and about 350° F., at least about 50 percent hydrolysis is desired, preferably at least about 80 percent hydrolysis. In these formations, less than complete hydrolysis will normally be employed, as a practical matter, due to the long shutin period required for complete hydrolysis. The quantity of acid precursor injected must, of course, be larger at these lower degrees of hydrolysis in order to provide the same yield of hydrohalic acid. In higher temperature formations, substantially complete hydrolysis can be achieved within a relatively short time period, such as less than 48 hours, and is therefore preferred. The time required for any desired degree of hydrolysis can be determined in the laboratory by a simple test which is described below in the determination of the time required for complete hydrolysis of tetrachloromethane.

A series of tests are performed to determine the time required for complete hydrolysis of tetrachloromethane at about 350° F. Approximately 1 gram of tetrachloromethane, 15 grams of deionized water and a calcium carbonate chip weighing about 2.6 grams are placed in a glass test tube and the test tube is sealed. The sealed tube is placed inside a cylindrical autoclave having an internal dimension slightly larger than the external dimensions of the sealed tube. The autoclave is pressurized with nitrogen to about 1,200 p.s.i.g. The contents of the autoclave are heated rapidly, e.g., at a rate of 50° F. per minute, up to 350° F. and then held at this temperature for varying preselected periods of time. At this temperature, the pressure inside the sealed tube is approximately 1000 p.s.i.g. At the end of the preselected time period, the contents of the autoclave are rapidly cooled to room temperature by circulating nitrogen through the autoclave. The glass tube is broken to recover the unreacted calcium carbonate chip for weighing. Calculations from the equation which represents the overall hydrolysis-acidization reaction:

$$CCl_4 + 2CaCO_3 \rightarrow 2CaCl_2 + 3CO_2$$

the weight loss expected for 100 percent hydrolysis of the 1 gram of tetrachloromethane is about 1.3 grams. The test in which the autoclave contents are maintained at 350° F. for 68 hours indicates complete hydrolysis of the tetrachloromethane. Similar series of tests are conducted for 400° F. and 500° F., and the time required for complete hydrolysis under these conditions is found to be about 4 hours and one hour, respectively.

If the rate of hydrolysis of a selected acid precursor is too rapid for a particular acidizing treatment, a retarder may be incorporated into the treating fluid to retard the hydrolysis reaction. The retarder should be nonpolymerizable and nonpyrolyzable under the high temperature and pressure conditions in the formation, and should be nonreactive with the formation constituents and the in situ-produced acid. Suitable retarders include the solvent refined, paraffinic lubricating oil base stocks, known as neutral oils and bright stocks. Preferred retarders are the highly paraffinic "white oils" which are acid refined from these base stocks. Exemplary retarders and their properties are as follows:

| Retarder | Gravity ° API | Nominal Boiling Point Range (° F.) | Viscosity (SSU) |
| --- | --- | --- | --- |
| 90 Neutral Oil | 30.8 | 640 – 790 | 90 at 100° F. |
| 300 Neutral Oil | 27.7 | 710 – 980 | 300 at 100° F. |
| 175 Bright Stock | 24.3 | 800 – plus | 175 at 210° F. |

These base stocks typically are between 70 and 90 percent saturated hydrocarbons with the balance being aromatic hydrocarbons. White oils are even more highly paraffinic.

Normally only very high temperature formations, such as geothermal formations having temperatures between about 500° F. and about 700° F. will require the use of a retarder. However, use of a retarder in acidizing other subterranean formations having temperatures above about 400° F. is contemplated. When a retarder is required, the treating fluid injected through the well into the formation in the method of this invention will consist essentially of a mixture of the retarder and the acid precursor. Exemplary treating fluids are mixtures consisting of from about 50 to 95 weight percent acid precursor with the balance being the retarder. The amount of retarder required for a particular acidization treatment is easily determined by repeating the aforementioned test for determining the time required for the desired degree of hydrolysis with differing amounts of retarder. For example, the time required for complete hydrolysis of a treating fluid consisting of 1 gram of a neutral oil marketed by Union Oil Company of California under the name Union 300 Neutral Oil and 1 gram of tetrachloromethane when mixed with 15 milliliters of a 3 weight percent NaCl solution was determined by this test to be between 16 and 20 hours at 400° F. as compared to less than 6 hours for tetrachloromethane in a 3 weight percent NaCl solution without the retarder.

Primary advantages realized in the method of this invention result from the fact that the acid precursors employed are noncorrosive under the high temperature conditions encountered prior to hydrolysis in the formation. To demonstrate the noncorrosivity of the anhydrous acid precursors, a series of tests are performed to determine the rate of corrosion of tetrachloromethane at a variety of high temperatures. Anhydrous tetrachloromethane and a weighed corrosion test specimen of N-80 steel are placed in a glass tube which is then sealed. The sealed tube is placed in an autoclave and is heated to a preselected high temperature for a selected period of time, after which it is cooled to 100° F. for the balance of 22 hours. The test specimen is then removed from the glass tube and weighed. The weight loss is converted to pounds per square foot of surface area. A weight loss of about 0.050 pounds per square foot is considered the maximum acceptable rate. Results of this series of tests are as follows:

| Temperature (° F.) | Time (Hours) | Corrosion Rate (pounds/sq. foot) |
| --- | --- | --- |
| 400 | 6 | 0.002 |
| 600 | 6 | 0.005 |
| 650 | 6 | 0.015 |
| 650 | 6 | 0.021 |
| 700 | 4 | 0.012 |
| 700 | 6 | 0.029 |

This data indicates that metal surfaces exposed to anhydrous tetrachloromethane prior to hydrolysis in the method of this invention will not be corroded to any significant extent. Accordingly, the method of this invention is suitable for the acidization of subterranean formations having temperatures much higher than the 250° F. practical maximum temperature of the prior art acidization methods.

The invention is further illustrated by the following examples which are illustrative of specific modes of practicing the invention and are not intended as limiting the scope of the invention as defined by the appended claims.

EXAMPLE 1

A natural gas-bearing dolomite formation having a temperature of about 350° F. and located at a depth of about 21,800 feet is acidized in accordance with the method of this invention. A production well penetrating the formation has a production tubing disposed therein. Nine discrete slugs of liquid are sequentially injected at a rate of about 20 barrels per minute through the production tubing into a mixing zone of the well adjacent the formation. The first, third, fifth, seventh and ninth slugs are each a 200 barrel slug of fresh water containing about 1,000 standard cubic feet of nitrogen per barrel, and the second, fourth, sixth and eighth slugs are each a 25 barrel slug of tetrachloromethane containing about 1,000 standard cubic feet of nitrogen per barrel. The injected fluids are at least partially mixed in said mixing zone to form a reaction mixture. The reaction mixture is displaced into the formation by injecting through the production tubing about 1 million standard cubic feet of nitrogen. The well is shut in for a period of 68 hours to allow substantially complete hydrolysis of the tetrachloromethane and complete reaction of the in situ-produced acid. At the end of this time period, the well is opened and the well effluent is contacted at the well site with a dilute ammonium hydroxide solution prior to returning the well to natural gas production.

EXAMPLE 2

The permeability of a subterranean geothermal formation penetrated by a production well has been damaged by the flashing to steam of a hot mineral-bearing brine within the formation. The production well having a depth of about 5500 feet communicates with the formation at a point therein having a temperature of about 650° F. An injection tubing having a downhole packer is positioned in the well, and cool water is circulated from the surface through the tubing and then back up the well annulus in order to cool the formation adjacent the borehole to about 400° F. in order that the downhole packer can be set. Thereafter, the packer is set to seal the well annulus, and 25 barrels of tetrachloromethane followed by 500 barrels of cool water are injected through the tubing and into the formation at a rate of about 10 barrels per minute. The well is shut in for a short time to allow the formation adjacent the borehole to return to 650° F. The well is then brought back into production.

EXAMPLE 3

A natural gas- and condensate-bearing sandstone formation having a temperature of about 320° F. and located at a depth of about 19,500 feet is fracture-acidized in accordance with the method of this invention. An injection tubing is positioned in a production well penetrating the formation and 20 barrels of a 5 weight percent solution of ammonium chloride in fresh water is injected into the formation to stabilize the clay in the formation. Then, 350 barrels of water containing 1,000 standard cubic feet of nitrogen per barrel of water are injected through the well annulus at a rate of about 10 barrels per minute, and, simultaneously, 35 barrels of tetrachloromethane followed by 20 barrels of water are injected through the injection tubing at a rate of about 1 barrel per minute. The injected fluids mix in a mixing zone of the borehole adjacent the formation to form a reaction mixture. The reaction mixture is displaced into the formation by simultaneously injecting through the tubing and the well annulus a total of 1 million standard cubic feet of nitrogen. The well is shut in for a period of about 20 hours to allow some hydrolysis of the tetrachloromethane and reaction of the in situ-produced acid.

At the end of the 20 hour period, 2,500 barrels of water containing 1,000 ppm of polyacrylamide polymer marketed under the trademark Pusher ® 1000 polymer by The Dow Chemical Company and 1,000 standard cubic feet of nitrogen per barrel of water, are injected through the well annulus at a rate of 50 barrels per minute, and, simultaneously, 250 barrels of a 2:1 mixture of tetrachloromethane and 1,1,2 trifluorotrichloroethane followed by 20 barrels of water are injected through the injection tubing at a rate of 5 barrels per minute, thereby hydraulically fracturing the formation. During the injection operation, the injected fluids mix in the borehole adjacent the formation to form a reaction mixture which is displaced into the formation and newly opened fractures. The reaction mixture is overdisplaced from the formation immediately adjacent the borehole by simultaneously injecting through the tubing and well annulus a total of 1 million standard cubic feet of nitrogen.

The well is shut in for a period of 68 hours to allow substantially complete hydrolysis of the acid precursor and complete reaction of the in situ-produced acid. Thereafter, the well is opened and the well effluent is contacted at the well site with a dilute ammonium hydroxide solution prior to returning the well to natural gas production.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A method for acidizing a subterranean formation having a temperature between about 250° F. and about 700° F., which comprises:
   introducing a substantially anhydrous treating fluid into a well communicating with said formation, said treating fluid consisting essentially of a normally liquid acid precursor having a generalized formula:

$C_xH_yX_z$ wherein
   $x = 1$ or 2;
   $y = 0$, 1 or 2, but $y \leq x$; and
   $z = 2x - y + 2$,
   and which is thermally stable under the temperature and pressure conditions in said well, or mixtures thereof; and
   displacing said treating fluid from said well and into said formation, wherein said acid precursor hydrolyzes in situ to generate a hydrohalic acid which reacts with said formation to increase the permeability thereof.

2. The method defined in claim 1 wherein said subterranean formation is a hydrocarbon-bearing formation.

3. The method defined in claim 2 wherein said treating fluid is introduced through an injection tubing disposed in said well and into a mixing zone at a point adjacent said formation, and further step the stop of introducing an aqueous fluid into said mixing zone to therein mix with said treating fluid prior to displacement into said formation.

4. The method defined in claim 1 wherein said subterranean formation contains an aqueous geothermal fluid, and wherein said acid precursor is introduced into said well through a substantially water-free injection tubing disposed in said well.

5. The method defined in claim 1 wherein said acid precursor is selected from the group consisting of tetrachloromethane, fluorotrichloromethane, bromotrichloromethane, dibromodichloromethane, trichlorochloromethane, tribromomethane, chlorodibromomethane, bromodichloromethane, iododibromomethane, chlorodiiodomethane, iododichloromethane, fluorochlorobromomethane, 1,2-difluorotetrachloroethane, 1,1,2-trifluorotrichloroethane, 1,1,2-trifluorotribromoethane, pentachloroethane, fluorotetrachloroethane, fluorotetrabromoethane, difluorotribromoethane, 1,2-dichloro 1,1,2-tribromoethane, 1,2-dichloro 1,2,2-tribromoethane, dibromotrifluoroethane, dibromotrichloroethane, fluorodichlorodibromoethane, tetrachloroethane, tetrabromoethane, fluorotrichloroethane, 1-fluoro 1,1,2-tribromoethane, 1-fluoro 1,2,2-tribromoethane, difluorodichloroethane, 1,1,-difluoro, 1,2-dibromoethane, 1,1-difluoro 2,2-dibromoethane, chlorotrithane, 1,1-difluoro 1,1,-dichloro 1,2-dibromoethane, 1,2-bromoethane, 1,1,-dichloro 1,2-dibromoethane, 1,1-dichloro 2,2-dibromoethane, bromotrichloroethane, and mixtures thereof.

6. The method defined in claim 1 wherein said acid precursor is selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane and mixtures thereof.

7. The method of claim 1 wherein said acid precursor is tetrachloromethane.

8. The method of claim 1 wherein said acid precursor is a mixture of tetrachloromethane and 1,1,2-trichlorotrifluoroethane.

9. The method of claim 1 wherein said treating fluid is introduced into said well in a plurality of discrete slugs and including the step of introducing into said well a plurality of discrete slugs of an aqueous liquid interposed between said discrete slugs of said treating fluid.

10. A method for acidizing a subterranean hydrocarbon-bearing formation having a temperature above about 250° F., comprising:
introducing a substantially anhydrous treating fluid through a tubing disposed in a well and into a mixing zone of the well adjacent said formation, said treating fluid consisting essentially of an acid precursor selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane and mixtures thereof;
introducing an aqueous fluid into said mixing zone, wherein said acid precursor and said aqueous fluid mix to form a reaction mixture; and
displacing said reaction mixture from said mixing zone and into said formation wherein said acid precursor hydrolyzes in situ to generate a hydrohalic acid which reacts with said formation to increase the permeability thereof.

11. The method defined in claim 10 wherein at least a part of the formation material to be acidized in said formation is calcium carbonate and wherein said acid precursor is tetrachloromethane.

12. The method of claim 10 wherein a plurality of discrete slugs of said treating fluid are introduced alternately with discrete slugs of said aqueous fluid through said tubing and into said mixing zone prior to displacement thereof into said formation.

13. The method of claim 10 wherein said aqueous fluid is introduced into said mixing zone through the annulus between said tubing and the walls of said well.

14. The method of claim 10 wherein at least a part of the formation material to be acidized in said formation is siliceous material, and wherein said treating fluid is introduced into said mixing zone as two discrete slugs, the first slug consisting essentially of tetrachloromethane and the second slug consisting essentially of a mixture of tetrachloromethane and 1,1,2-trichloro trifluoroethane.

15. The method of claim 14 wherein the ratio of said tetrachloromethane to said 1,1,2-trichlorotrifluoro ethane in said second slug is selected to produce, upon hydrolysis of said second slug, a hydrochloric acid to hydrofluoric acid ratio between about 2 and about 5.

16. The method defined in claim 10 wherein said aqueous fluid is an aqueous solution containing a water-soluble viscosity increasing agent, and including the step of simultaneously applying a high pressure to the injected fluids to thereby hydraulically fracture the formation as it is being acidized.

17. The method of claim 10 wherein said reaction mixture is displaced into said formation by nitrogen.

18. The method of claim 10 wherein said aqueous fluid is an aqueous liquid containing between about 50 and about 5000 standard cubic feet of nitrogen per barrel of aqueous liquid.

19. A method for acidizing a subterranean formation having a temperature between about 400° F. and 700° F. and containing an aqueous geothermal fluid which comprises:
introducing an anhydrous treating fluid through a tubing disposed in a well into a zone of the well adjacent said formation, said treating fluid consisting essentially of an acid precursor selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane and mixtures thereof; and
displacing said treating fluid from said zone and into said formation, wherein said acid precursor hydrolyzes in situ to generate a hydrohalic acid which reacts with the formation to increase the permeability thereof.

20. The method defined in claim 19 wherein said acid precursor is tetrachloromethane.

21. The method of claim 19 wherein at least a part of the formation material to be acidized in said formation is siliceous material, and wherein said treating fluid is introduced into said zone as two discrete slugs, the first slug consisting essentially of tetrachloromethane, and the second slug consisting essentially of a mixture of tetrachloromethane and 1,1,2-trichlorotrifluoroethane.

22. The method of claim 19 wherein the ratio of said tetrachloromethane to said 1,1,2-trichlorotrifluoroethane in said second slug is selected to produce, upon hydrolysis of said second slug, a hydrochloric acid to hydrofluoric acid ratio between about 2 and about 5.

23. The method defined in claim 19 including the step of simultaneously applying a high pressure to the injected fluid to thereby hydraulically fracture the formation as it is being acidized.

24. A method for acidizing a subterranean formation having a temperature above about 400° F., which comprises:
introducing a substantially anhydrous treating fluid into a well communicating with said formation, said treating fluid consisting essentially of a mixture of (1) a normally liquid acid precursor having a generalized formula:

$C_xH_yX_z$ wherein
$x = 1$ or 2;
$y = 0$, 1 or 2, but $y \leq x$; and
$z = 2x - y + 2$,
and which is thermally stable under the temperature and pressure conditions in said well, and (2) a solvent refined, paraffinic lubricating oil base stock, or an acid-refined derivative thereof, composed of at least about 70 percent saturated hydrocarbons having normal boiling points above about 640° F.; and
displacing said treating fluid from said well and into said formation, wherein said acid precursor hydrolyzes in situ to generate a hydrohalic acid which reacts with said formation to increase the permeability thereof.

25. The method defined in claim 24 wherein said acid precursor is selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane, and mixtures thereof.

26. The method defined in claim 25 wherein said subterranean formation has a temperature between about 500° F. and about 700° F. and contains an aqueous geothermal fluid.

27. The method defined in claim 24 wherein said treating fluid consists of from about 50 to about 95 weight percent of said acid precursor and the balance being said solvent refined, paraffinic lubricating oil base stock, or said acid-refined derivative thereof.

28. The method defined in claim 24 wherein said acid precursor is tetrachloromethane.

* * * * *